May 13, 1924.

C. A. FAUST 1,493,485

MEANS FOR LEARNING TO WRITE

Filed Oct. 15, 1921

2 Sheets-Sheet 2

INVENTOR:
Charles A. Faust
By E J Andrews
Att'y.

Patented May 13, 1924.

1,493,485

UNITED STATES PATENT OFFICE.

CHARLES A. FAUST, OF CHICAGO, ILLINOIS.

MEANS FOR LEARNING TO WRITE.

Application filed October 15, 1921. Serial No. 507,867.

*To all whom it may concern:*

Be it known that I, CHARLES A. FAUST, a citizen of the United States, residing at Chicago, in the county of Cook and State of Illinois, have invented certain new and useful Improvements in Means for Learning to Write, of which the following is a specification.

This invention relates to writing and it has for its object the production of means for assisting the teacher in instructing pupils how to write properly, and particularly how to properly form the various letters of the alphabet, and also to assist persons who so desire in learning to write without any particular assistance otherwise. In general the means provided comprise certain guide forms having curves for guiding the chalk, pen or pencil of the learner while forming the letters. The sheets are so made that the edges thereof or the edges of openings therein may be used for producing curves, each of which may be used in writing portions of several letters, so that only a relatively small number of curves is necessary in order to produce all of the letters of the alphabet, both upper and lower case; and in fact to produce, if desired, more than one type of letters; for instance the Spencerian as well as the standard types. In connection with the guide forms keys are provided which indicate to the learner what curves are to be used, and the particular manner of using the curves. At the same time the arrangement of the forms and the curves thereof is such that the learner acquires, by the use of the forms, a knowledge of the relative dimensions, as well as the shapes of the various letters and the various portions of each letter.

Other objects of the invention will be apparent from a consideration of the accompanying drawings and the following description thereof.

Figure 1:
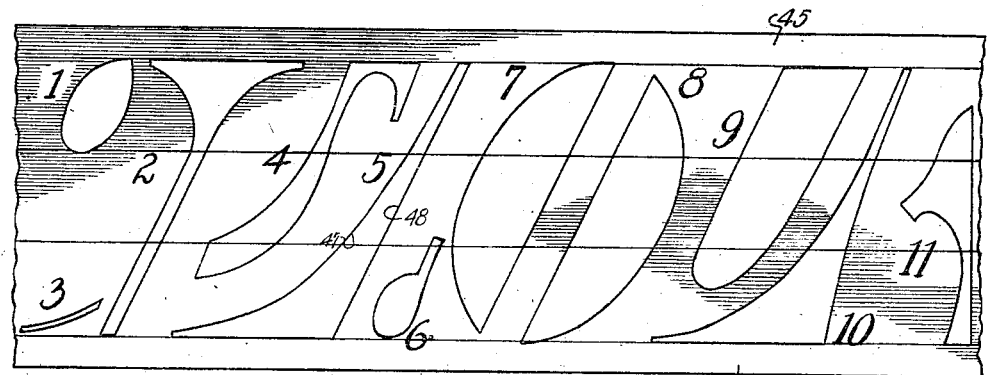
Figure 2:
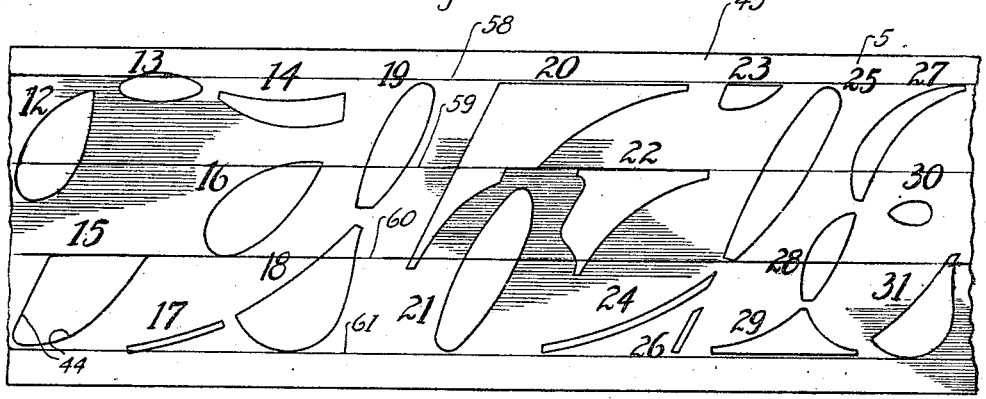
Figure 3:
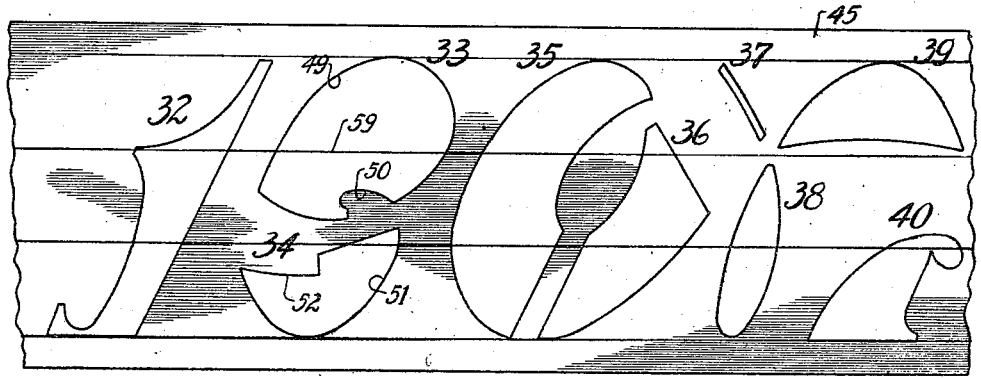
Figures 4, 5:
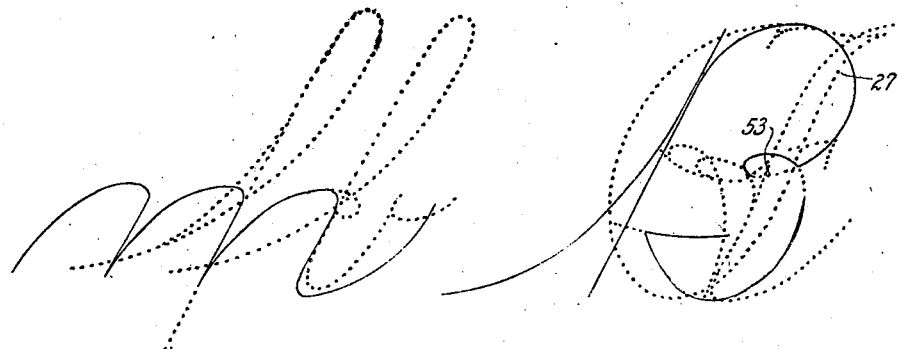
Figure 7:
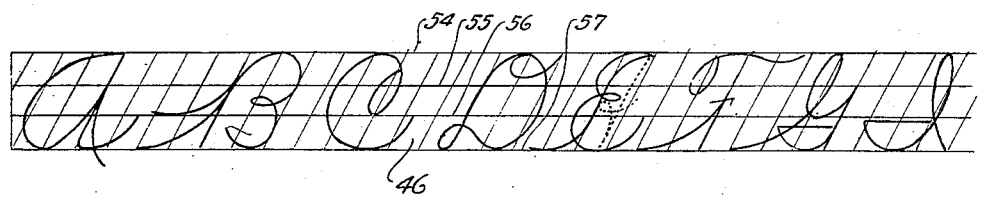
Figure 6:
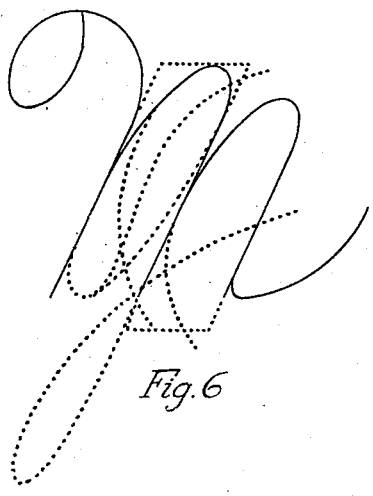

Of the drawings Figs. 1, 2, and 3 indicate the guide forms having suitable curves, which embody the features of my invention; Figs. 4, 5, and 6 indicate the manner in which the letters are made by the use of the forms; Fig. 7 is a plate of correct letter forms which may be used to assist in properly forming the letters.

The forms 45 are made from strips of any suitable material, such as cardboard, celluloid, or any substance which is adapted to be formed into sheets of rather material thickness, and are of sufficient strength and hardness to form edges for guiding the pencil of the learner. I prefer vulcanized fiber for the purpose. The curves are made in the forms by cutting the edges to the shape desired, and particularly by cutting openings through the forms, the edges of the openings forming such curves as may be desired for the particular purpose. Each of the openings is given a specific number, as indicated, and the key hereinafter described indicates the particular opening the curve of which is to be used in the formation of any particular letter. For instance, in the formation of the letter *m* (full lines of Fig. 4) the curve 44 of the opening 15 is used three times inverted and once, to form the final tail of the *m*, when the form is used right side up. It is to be understood that in the use of the forms, the letter which is desired to be made is always before the learner on a guide plate similar to the plate 46. The learner, however, instead of attempting to copy the letter, which invariably results at first in a very improper form of letter, uses the proper curves, and the proper form of letter is thus produced even by a primary pupil; and in so forming the letter each portion thereof may be formed by the learner over and over until the muscles acquire a tendency to form the curve correctly.

The key which I provide in connection with the sheets indicates the curves to be used in forming each letter. A portion of such a key is as follows:

A—5, 2, 5, 5, 36.
    B—5, 5, 33, 34.
    C—35, 36.
    D—7, 6, 8, 6.
    E—29, 28, 27, 30, 35.
    F—13, 14, 27, 28, 29, 34, or 5, 5, 12, 13, 14, 4.
    G—20, 21, 2 or 20; or 20, 21, 20, 20, 34.
    H—5, 5, 2, 11, 33.
    I—37, 38, 39.
    J—7, 9, 25, 24.
    K—5, 5, 5, 11, 15, or 5, 5, 5, 33, 36.
    L—17, 18, 19, 13, 14.
    M—1, 2, 9, 9, 15.
    N—1, 2, 9, 7, or 1, 2, 9, 15.
    R—5, 5, 33, 15.
    U—1, 2, 9, 7.
    V—1, 2, 4.

In the use of this key, the letter B is formed, Fig. 5, by the use of the curves of the openings 5, 33 and 34, in the order specified, it being understood that the learner has before him the letter itself on the plate 46 and will thus be able to use the proper curves. For instance, in the formation of B the curves of the openings are used in the following order: 47 and 48 of the opening 5, 49 and 50 of the opening 33, and 51 and 52 of the opening 34, thus completing the letter, except for a small portion omitted at the point 53, shown dotted in Fig. 5, which is easily filled in by the learner.

The system comprises also, in connection with the letters themselves, certain dimension lines 54, 55, 56 and 57, Fig. 7, on the plates, which show the relative dimensions of the letters and the various portions thereof; and on the guide forms are lines 58, 59, and 60 and 61 which correspond in relative position to the lines of the guide plates; so that the learner is able not only to more easily select the proper curves but he is able to form correctly the letters by the use of the curves, and to place them in the proper positions, and also to acquire more complete knowledge of the correct formation of the letters for guidance when the forms are not used. For instance in writing B and using curve 49, lines 55, Fig. 7 and 59 Fig. 3, correspond and indicate how much of the curve 49 is to be used.

By the use of this system not only may both large and small script letters be formed, but modifications in these letters may be made when desired, all by the use of a relative small number of curves, as each curve serves many purposes, so that small guide forms may be used. At the same time the learner is brought to a realization of the various relations of portions of various letters much more definitely than would be the case if stencils or some other types of guide forms were used. For instance, the learner realizes that certain portions of m or n when inverted form the letter u, i, w, x, etc., and that the ovals for the letters P, B, and R are similar, and so on. This is more clearly indicated by Figs. 4, 5 and 6. In the case of Fig. 4, the curve 44 of the opening 15 is used not only to form the letter m, but also is used to form the various other letters that are indicated partly in dotted lines. By the use of the curves of the opening 25 and certain curves of the openings 15, 23, 24, and 40, the following letters may be formed: m, n, v, h, k, p, by using the sheets upright, and the following letters i, u, w, j, and v may be formed by using the sheets inverted. And, as is indicated by Fig. 5, and the key hereinabove referred to, letters B (two styles), F, H, and R have certain portions similar; and J, M, N, I, U and V (Fig. 6) have certain portions similar. For instance all of the latter letters use curves of openings 1 and 2, and N and U are formed from the same openings 1, 2, 9 and 7. That different types of letters may be made by the same forms is indicated by the guide plate 46, which shows two endings for A, and also the old type of A combined in dotted lines with E. These examples clearly indicate to the learner the close relations which exist among the portions of certain letters, so that he does not feel the necessity of learning every curve of every letter as a distinct curve, but more conveniently learns to form a much smaller number of curves and then applies them to the formation of the complete letters.

I claim as my invention:

Means for learning to write, said means comprising a guide form composed of a sheet of material having various unsymmetrically shaped unlike openings therein, certain portions of the continuous edges of some of said openings having varying radii of curvature and being formed to correspond in shape to certain curves of portions of certain types of script letters, whereby by using the said edges as guides for the pencil a child may become familiar with the said curves, and by the use of certain combinations of curves he may become familiar with entire letters of the said types; in combination with a key for indicating how the combinations are to be made.

In testimony whereof, I hereunto set my hand.

CHARLES A. FAUST.